United States Patent [19]

Kato et al.

[11] Patent Number: 5,008,054
[45] Date of Patent: Apr. 16, 1991

[54] CERAMIC INJECTION MOLDED BODY AND METHOD OF INJECTION MOLDING THE SAME

[75] Inventors: Shigeki Kato, Nagoya; Katsuhiro Inoue, Aichi, both of Japan

[73] Assignee: NGK Insulators, Ltd., Japan

[21] Appl. No.: 455,229

[22] Filed: Dec. 22, 1989

[30] Foreign Application Priority Data

Dec. 24, 1988 [JP] Japan .................. 63-326932

[51] Int. Cl.$^5$ .............................................. C04B 35/64
[52] U.S. Cl. .......................... 264/63; 501/81; 501/88; 501/97
[58] Field of Search ................. 501/81, 82, 83, 87, 501/97, 88; 264/42, 63

[56] References Cited

U.S. PATENT DOCUMENTS 4,248,813  2/1981  Hattori et al. .................. 264/62
4,891,174  1/1990  Seki et al. ....................... 501/81

FOREIGN PATENT DOCUMENTS 3630690  5/1989  Fed. Rep. of Germany .

Primary Examiner—Mark L. Bell
Assistant Examiner—Deborah Jones
Attorney, Agent, or Firm—Parkhurst, Wendel & Rossi

[57] ABSTRACT

A ceramic injection molded body which is heated to remove organic binder and then hydrostatically pressed after injection molding. The molded body has a volume of fine pores having a diameter of at least 0.1 μm being at least 30% of the total volume of fine pores in the molded body after removed of organic binders, and the volume of fine pores having a diameter of at most 0.1 μm being at least 50% of the total volume of fine pores in the molded body after hydrostatic pressing.

2 Claims, 2 Drawing Sheets (A): Process of Spray Dry Granulating
(B): Process of Press Granulating

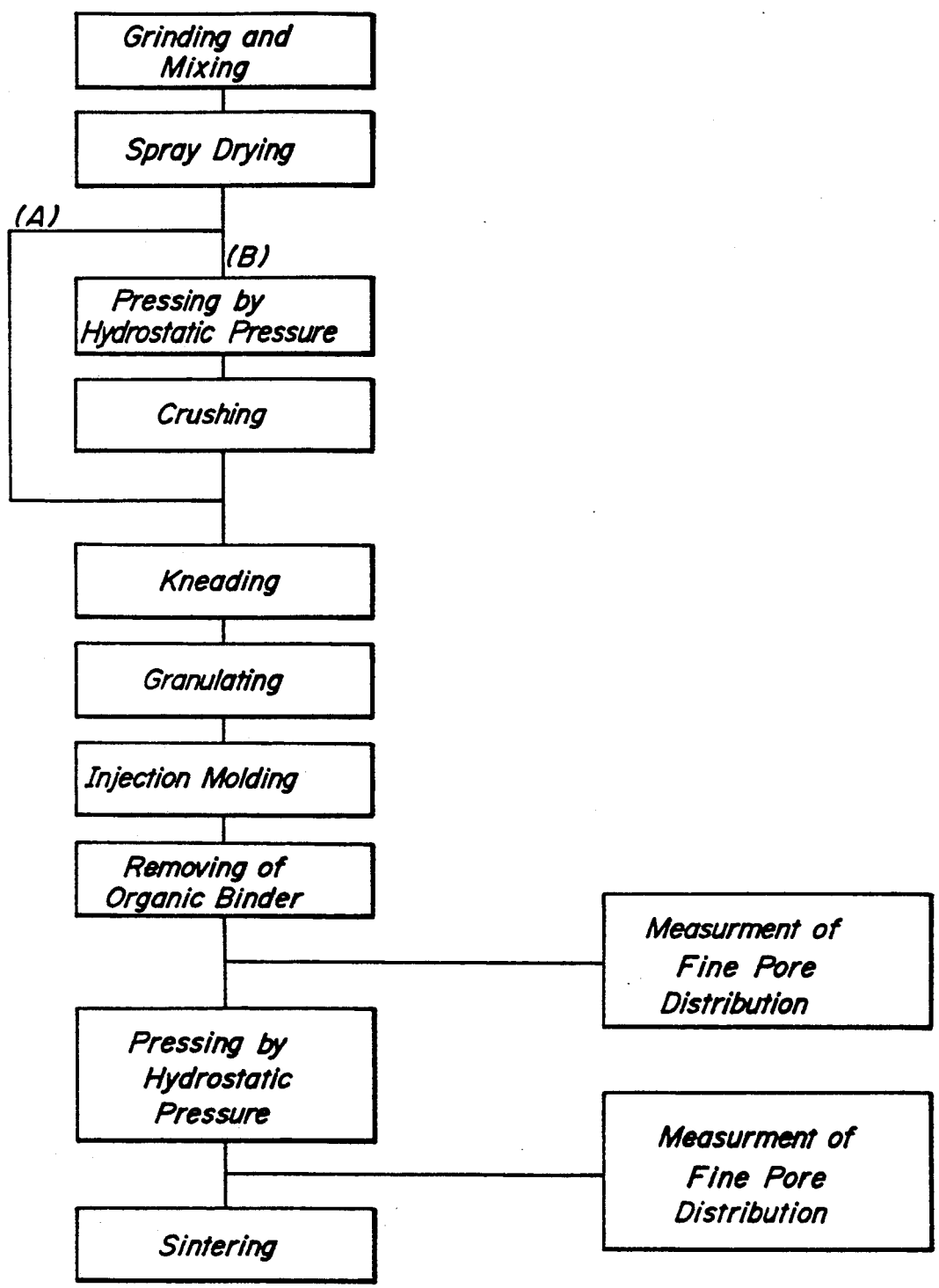

FIG_2
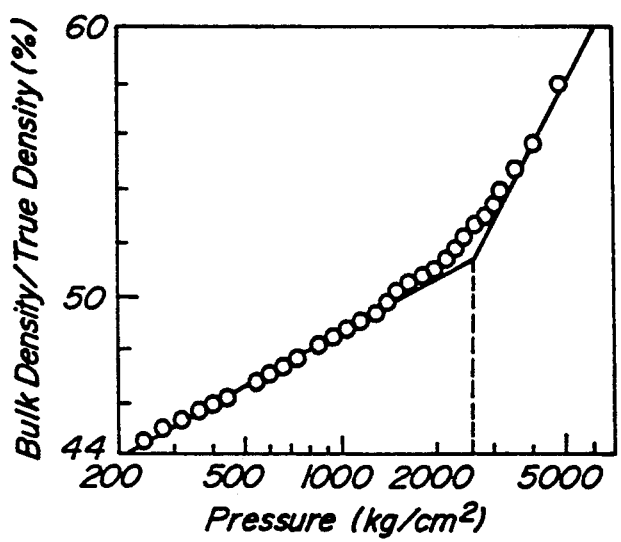

CERAMIC INJECTION MOLDED BODY AND METHOD OF INJECTION MOLDING THE SAME

BACKGROUND OF THE INVENTION

1. Field of the Invention

The present invention relates to a ceramic injection molded body and a method of molding the ceramic body by controlling distribution of fine pores in the molded body after removal of organic binders to improve yield in removing of organic binders and characteristics of a sintered body.

2. Related Art Statement

Recently, there has been actually made research performed on utilizing silicon ceramics to make engine parts or the like because silicon ceramics, such as silicon nitride, silicon carbide, sialon or the like, are more stable and less susceptible to oxidation or creep deformation at high temperatures, when compared to metals. For example, radial turbine rotors made of these ceramic materials are lighter and superior in thermal efficiency, allowing the operating temperature of engines to be raised, as compared with metallic rotors, so that these materials are drawing attention as turbocharger rotors, gas turbine rotors, etc. for automobiles.

However, since such a turbine rotor has complicated three-dimensional shaped blades, naturally it is almost impossible to finish by grinding a sintered body having a simple shape such as a round rod, square rod or the like into a desired shape and also it is difficult to obtain such a ceramic body having a complicated configuration by only one molding operation. Other than the above, injection molding methods have been extensively employed for molding the complicated ceramic bodies.

The method of injection molding of ceramics is an application of the conventional injection molding method which has been used for molding plastics. Generally, in injection molding of a ceramic body, ceramic powder is mixed in a kneader with organic binder consisting of a binding agent such as polyethylene, polystyrene or the like, wax, and lubricant. The mixture is subsequently heated to plasticize the binder and then injection molded in a mold. The thus molded body is heated to remove the binder, hydrostatically pressed and finally sintered to obtain a ceramic sintered body. According to the injection molding method, complicated ceramic articles can be rapidly and accurately obtained by only one molding operation with less finishing allowance, otherwise many manufacturing processes are required.

In the aforementioned conventional injection molding method for producing a ceramic article, the raw material powder is granulated. However, when the strength of the granulated particles is low, the granulated particles are ground into fine particles during kneading of the mixture of ceramic powder and binder. As a result, the fluidability of the mixture is deteriorated, and cracks are often observed in the molded body after removing the binder.

On the other hand, when the strength of the granulated particles is high or the pressure level of the hydrostatic pressing is low, wrecks of coarse granulated particles remain in the pressed body after pressing. Consequently the pressed body is not so uniform and accordingly, a uniform sintered body cannot be obtained.

SUMMARY OF THE INVENTION

Thus, the inventors conducted assiduous studies on the process of injection molding and have found that it is very important to control distribution of fine pores in a molded body after removing organic binder. The control of distribution is accomplished by controlling the strength of granulated particles such that granulated particles are not pulverized during the kneading process, but are crushed during the hydrostatic pressing process after removing of organic binders or by selecting shearing force caused by kneading and hydrostatic pressing corresponding to the strength of granulated particles, and thus have reached the present invention.

An object of the present invention is to provide a fine ceramic sintered body having a high bending strength.

Another object of the present invention is to provide an improved injection molding method for obtaining a fine ceramic sintered body having a high bending strength.

The first aspect of the present invention is the provision of a ceramic injection molded body which is burned to remove binders and hydrostatically pressed after injection molding, wherein the volume of fine pores having a diameter of at least 0.1 $\mu$m is at least 30% of the total volume of fine pores in the molded body after removal of the organic binders, and the volume of fine pores having a diameter of at most 0.1 $\mu$m is at least 50% of the total volume of fine pores in the molded body after hydrostatic pressing. The volume values of fine pores may be measured by means of mercury porosimetry.

The second aspect of the present invention is the provision of a method of injection molding a ceramic molded body comprising the steps of granulating a raw material after grinding, kneading the granulated particles, injection molding the kneaded body, and hydrostatically pressing, wherein distribution of fine pores in the molded body is controlled such that the volume of fine pores having a diameter of at least 0.1 $\mu$m is at least 30% of the total volume of fine pores in the molded body after removing of organic binders, and the volume of fine pores having a diameter of at most 0.1 $\mu$m is at least 50% of the total volume of fine pores in the molded body after hydrostatic pressing.

The invention will be now described in more detail with reference to the accompanying drawings.

BRIEF DESCRIPTION OF THE DRAWINGS

FIG. 1 is a blocked flow sheet showing the steps of the injection molding method according to the present invention; and FIG. 2 is a graph showing a relationship between pressure applied to granulated particles and bulk density of pressed bodies.

DESCRIPTION OF THE PREFERRED EMBODIMENTS

The raw material for the molded body of the present invention is prepared as shown in the flow sheet of FIG. 1 by, for example, (A) a method comprising the steps of grinding and mixing raw materials spray drying the mixture, granulating particles and kneading the granulated particles (spray dry granulating method) or (B) a method comprising the steps of hydrostatic pressing the particles after spray drying in method (A), crushing the pressed particles to obtain granulated particles, and kneading the granulated particles.

When the granulated particles prepared by these methods are not crushed before sintering, wrecks of granulated particles remain in the body, and, as a result, sintering properties of the molded body are deteriorated, and the strength of the sintered molded body is decreased. Therefore, when the granulated particles are crushed before sintering such that the volume of fine pores having a diameter of at most 0.1 μm is at least 50% of the total volume of fine pores in the molded body after hydrostatic pressing, the sintering properties of the molded body become excellent. However, when the granulated particles are ground to fine particles during kneading before injection molding, fluidability of the kneaded material is decreased, and as a result, cracks occur in the molded body and the thickness of the molded body which can be heated to remove organic binder without cracking is limited. Therefore, it is necessary to prepare the granulated particles to avoid grinding during kneading before injection molding, but to ensure crushing by the hydrostatic pressure during hydrostatic pressing before sintering.

The distribution of fine pores in the injection molded body after removing of the organic binders is varied by the strength of granulated particles and shearing force during kneading. Accordingly, it is preferable that the strength of granulated particles is controlled such that granulated particles are not ground by kneading or the shearing force of kneading is selected to correspond to the strength of granulated particles.

Moreover, the distribution of fine pores in the injection molded body after hydrostatic pressing is varied by the strength of the granulated particles and the hydrostatic pressure. Accordingly, it is preferable that the strength of granulated particles is controlled such that the granulated particles are crushed by hydrostatic pressing or hydrostatic pressure and the hydrostatic pressing is selected to correspond to the strength of granulated particles.

Thus, the inventors have variously experimented and found that when the distribution of fine pores in an injection molded body after heating to remove organic binder is such that the volume of fine pores having a diameter of at least 0.1 μm is at least 30% of the total volume of fine pores in the molded body after heating to remove organic binder, and the volume of fine pores having a diameter of at most 0.1 μm is at least 50% of the total volume of fine pores in the molded body after hydrostatic pressing, the aforementioned condition is satisfied and consequently, the molded body has a high yield in removing of organic binder and the sintered body obtained by heating, hydrostatic pressing and subsequently sintering, has a high strength.

FIG. 2 shows a relationship between pressure applied to granulated particles and bulk density of pressed bodies. It is seen from FIG. 2 that the yield point of the granulated particles is 2.5 ton/cm$^2$ at point "a" and therefor, the granulated particles can be crushed by pressing them under a pressure of at least 2.5 ton/cm$^2$. It is noted that the yield point of the granulated particles depends on the granulating method and is not constant.

The condition that the volume of fine pores having the diameter of at least 0.1 μm is at least 30% of the total volume of fine pores in the molded body after removal of organic binder, means that the granulated particles are hardly crushed. That is, it is difficult to remove organic binder from the molded body without the occurrence cracks owing to very small sized raw material in conventional injection molding because, in the step of burning for removing organic binder, when passages through which gas of burned organic binder flows out of the molded body are too narrow, gas pressure inside the molded body becomes too high, resulting in the occurrence of cracks. Accordingly the raw material must be granulated. By granulating the raw material, large passages are formed in the molded body for removing the organic binder, and as a result a molded body having the aforementioned distribution of fine pores after removal of organic binder is obtained.

While the condition that the volume of fine pores having a diameter of at most 0.1 μm is at least 50% of the total volume of fine pores in the molded body after hydrostatic pressing, means that the granulated particles are substantially crushed to fine particles during hydrostatic pressing. That is, the sintering properties of injection molded body and the characteristics such as bending strength and the like of sintered body are so excellent as the particle in the molded body is fine. Accordingly, it is necessary to crush the granulated particles in the molded body by hydrostatic pressing to return the particles in the molded body to fine particles before sintering. The thus obtained molded body containing fine particles crushed by hydrostatic pressing satisfies the condition that the volume of fine pores having a diameter of at most 0.1 μm is at least 50% of the total volume of fine pores in the molded body after hydrostatic pressing. When the particles in the molded body after hydrostatic pressing are out of the aforementioned range, wrecks of granulated particles remain, and as a result, the properties of the sintered body are deteriorated.

The ceramics used in the present invention are for example known oxides such as alumina, zirconia or the like as well as new ceramics such a silicon nitride or the like nitride, silicon carbide or the like carbide and their composite materials.

Hereinafter, the present invention will be explained in more detail with examples.

FIG. 1 is a flow sheet showing the outline of the injection molding method of the present invention.

EXAMPLE 1

100 parts by weight of silicon nitride powder was added with 2 parts by weight strontium oxide, 3 parts by weight magnesia and 3 parts by weight cerium oxide as sintering aids. These powder materials were ground and mixed to prepare a mixed powder having an average diameter of 0.5 μm. Some fraction of the mixed powder was dried by the spray dry granulating method as shown in FIG. 1(A) to prepare granulated particles having an average diameter of 30 μm, and the remainder of the mixed powder was granulated according to the method as shown in FIG. 1(B) by use of hydrostatic pressure (1.0 ton/cm$^2$, 3.0 ton/cm$^2$, 4.0 ton/cm$^2$ and 7.0 ton/cm$^2$) and then crushed to prepare granulated particles having an average diameter of 30 μm.

Subsequently, 100 parts by weight of the prepared powder was added with 3 parts by weight binding agent, 15 parts by weight wax and 2 parts by weight lubricant and was kneaded. The kneaded material was granulated by means of an extruder and then injection molded to produce a turbocharger rotor of an integrated molded type having a rotor diameter of 50 mm. The molded rotor was heated to a temperature of 400° C. at a rate of 1°~3° C./hr in an electric furnace and kept at 400° C. for five hours to remove the organic binders, and then the distribution of fine pores was measured by mercury porosimetry.

Further, each of molded bodies was pressed by hydrostatic pressure of 4.0 ton/cm² or 7.0 ton/cm² and then the distribution of fine pores was measured.

Finally, the molded bodies were fired at 1,700° C. for one hour in a nitride atmosphere of normal pressure and turbocharger rotors of integrated blade and shaft type were obtained. The results of this example are shown in Table 1.

TABLE 1

| Sample No. | | Granulating method | Granulating pressure (ton/cm²) | Molded body Volume percent of fine pores of at least 0.1 μm (%) | Crack | Hydrostatic pressure (ton/cm²) | Volume percent of fine pores of at most 0.1 μm after hydrostatic pressing (%) | Strength of sintered body (kg/mm²) |
|---|---|---|---|---|---|---|---|---|
| Invention | 1 | A | — | 55 | non | 4.0 | 68 | 103 |
| | 2 | A | — | 55 | non | 7.0 | 97 | 117 |
| | 3 | B | 3.0 | 32 | non | 4.0 | 52 | 98 |
| | 4 | B | 3.0 | 32 | non | 7.0 | 77 | 108 |
| | 5 | B | 4.0 | 53 | non | 7.0 | 72 | 108 |
| Comparative example | 6 | B | 4.0 | 38 | non | 4.0 | 45 | 65 |
| | 7 | B | 7.0 | 78 | non | 7.0 | 22 | 53 |
| | 8 | A | — | 12 | occur | — | — | — |
| | 9 | B | 1.0 | 3 | occur | — | — | — |

It is seen from the results shown in Table 1 that the samples of No. 1, 2, 3, 4 and 5 of the present invention satisfy the condition that the volume of fine pores having diameter of at least 0.1 μm is at least 30% of the total volume of fine pores in the molded body after removal of the organic binders, and volume of fine pores having a diameter of at most 0.1 μm is at least 50% of the total volume of fine pores in the molded body after hydrostatic pressing. Consequently, the yield in removal of organic binder of the molded body and characteristics of the sintered body, such as strength, are improved.

According to the injection molded body and molding method of the present invention, the granulated particles are not pulverized during kneading, while the granulated particles are crushed to very small particle sizes during hydrostatic pressing after removal of the organic binders, and as a result the yield in removal of organic binder can be improved and a sintered body having excellent characteristics, such as a high bending strength, can be obtained.

What is claimed is:

1. A method of producing a sintered ceramic body, comprising the steps of:
    granulating a ceramic powder to form granulated particles;
    kneading the granulated particles with the addition of at least one organic binder;
    injection molding the kneaded particles to form a molded body;
    heating the molded body to burnout said organic binder;
    hydrostatically pressing the molded body; and
    sintering the hydrostatically pressed, molded body;
    wherein the granulating and kneading steps are performed under conditions selected to prevent crushing of the granulated particles during kneading, such that at least 30% of the total volume of pores in the molded body after the heating step have a diameter of at least 0.1 μm, and wherein the hydrostatic pressing step is performed under conditions selected to crush the granulated particles contained in the molded body, such that at least 50% of the total volume of pores in the hydrostatically pressed, molded body after the hydrostatic pressing step have a diameter of at most 0.1 μm.

2. The method of claim 1, wherein the hydrostatic pressing step is performed under a pressure of at least 2.5 ton/cm².

* * * * *